Jan. 24, 1950 — W. W. VANDER CLUTE — 2,495,615
WELDED COUPLING
Filed April 17, 1944 — 2 Sheets-Sheet 1
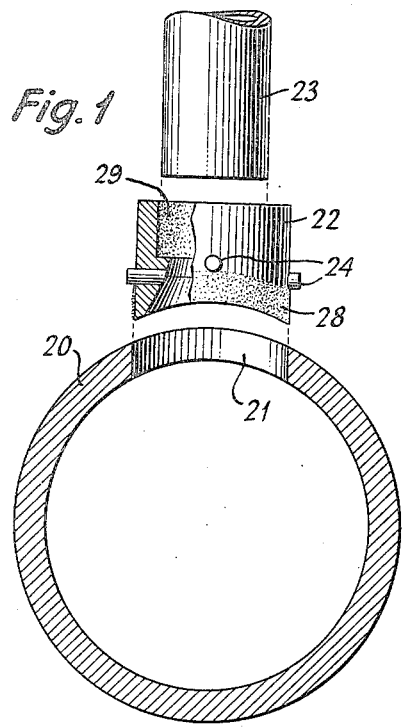
Fig. 1
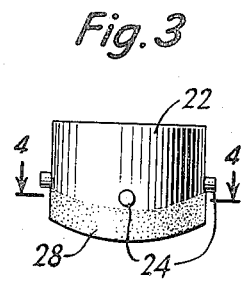
Fig. 3
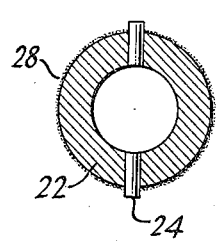
Fig. 4
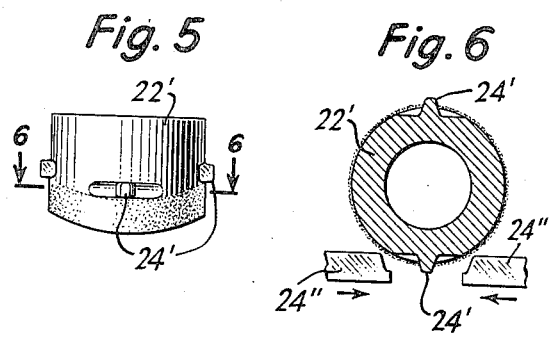
Fig. 5
Fig. 6
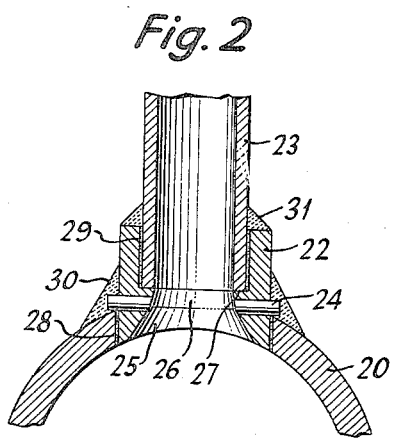
Fig. 2
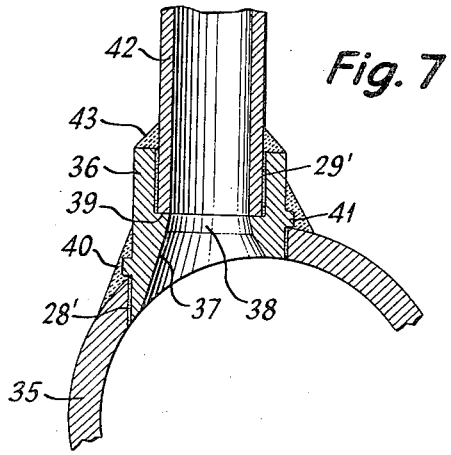
Fig. 7
INVENTOR
WILLIAM W. VANDER CLUTE,
BY
William A. Zalesak
ATTORNEY

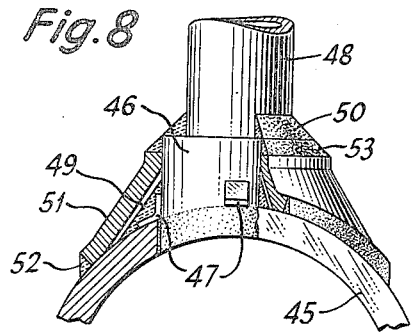
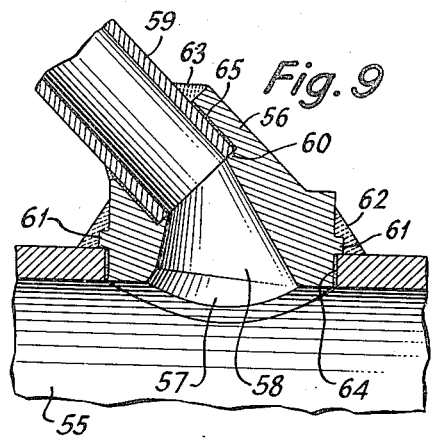
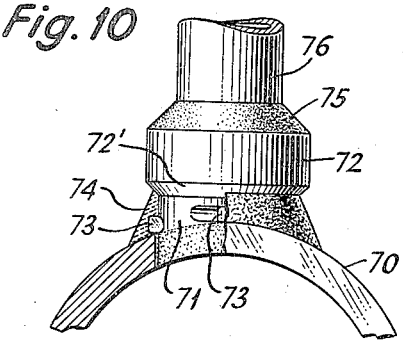
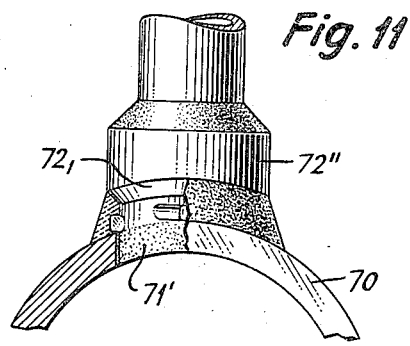
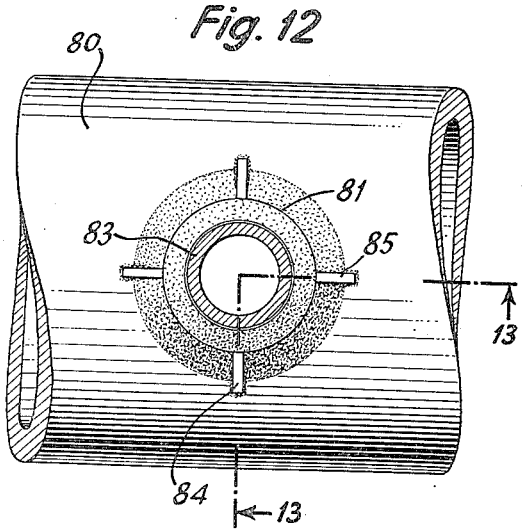
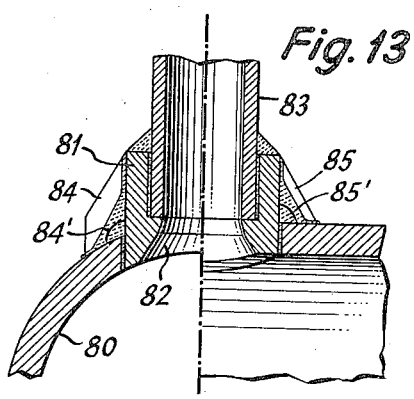

Patented Jan. 24, 1950

2,495,615

UNITED STATES PATENT OFFICE 2,495,615

WELDED COUPLING

William W. Vander Clute, Elizabeth, N. J., assignor to Round Root Corporation, Elizabeth, N. J.

Application April 17, 1944, Serial No. 531,344

3 Claims. (Cl. 285—106)

My invention relates to welded connections between metallic bodies carrying fluids under pressure, more particularly to welded pipe couplings and to the method and system employed for providing such couplings.

Failures of welded couplings utilizing threaded connections have been quite common. This failure of such fittings has been attributed to the inability of these couplings to withstand shock, vibration and relative motion between the small piping and machinery units on which the threaded welded outlet fittings are installed.

In the usual type of welded outlet fitting, it is common practice to make the fittings by pattern where, for a lateral or nipple connection to a header a template, shaped to the saddling shape of a pipe saddling another, is placed on the header, and an accurately punched center line is made around the outline of the template. Along this line a mechanic flame cuts to produce an egg-shaped hole in the header pipe and then the wall surface of the header around the hole is filed and ground to a smooth surface. Also, the contacting pipe or nipple has to be ground or fitted to the shape of the header. After this the lateral pipe is held in position on the header and welded to the header. This not only produces a poorly shaped interior bore connection of the pipe nipple or coupling with the header, but making a coupling in this manner on large pipes requires in many cases approximately four hours for two men for one welded coupling.

In the usual welded coupling it is practically a very difficult if not impossible operation to provide both inside and outside welds. Such inside and outside welds are highly desirable for the purpose of strengthening the connection.

In the usual arrangement in the method described above proper seating of the fittings or coupling members in the header pipe is difficult to insure, particularly where the so-called shoulder saddling fitting cannot be utilized, as in the case of small size headers and fittings.

In the usual coupling member abrupt angles are presented to the flow of fluid or liquid from the header into the connecting pipe at the coupling.

It is, therefore, an object of my invention to provide an improved form of welded connections and a method and system for providing such connections.

A further object of my invention is to provide such a connection which is substantially immune to shock or vibration and incident relative motion of the parts connected, but which nevertheless provides an easy, quick method for accurately positioning an outlet coupling in relation to a pressure vessel or header piping with which it is used.

A still further object of my invention is to provide a novel welded outlet connection in which the time for making the installation is substantially reduced to a matter of minutes instead of hours.

A still further object of my invention is to provide such a coupling in which inside and outside welds are simultaneously produced without the use of special welding equipment.

Another object of my invention is to provide such a coupling device which is preformed to properly fit a header pipe and which is properly seated for immediate welding operations when the aperture in the header is simply and accurately formed for reception of the coupling member.

A further object of my invention is to provide such a coupling member which insures the free flow of fluid or liquid from the header or vessel into the coupling and the associated connected pipe.

Another object of my invention is to provide a coupling member having novel positioning and reenforcing means integrally associated with the coupling.

These and other objects will appear hereinafter.

The novel features which I believe to be characteristic of my invention are set forth with particularity in the appended claims but the invention itself will best be understood by reference to the following description taken in connection with the accompanying drawing in which Figure 1 shows an exploded view of the elements used in connection with my invention, Figure 2 is a longitudinal section of the parts in assembly and made according to my invention, Figure 3 is a view 90° with respect to Figure 1 of the coupling member used in Figures 1 and 2, Figure 4 is a transverse section taken along the line 4—4 of Figure 3, Figure 5 shows a modification of the coupling shown in Figure 3 and made according to my invention, Figure 6 is a transverse section taken along the line 6—6 of Figure 6, and also showing the method of manufacture, Figure 7 is a longitudinal section of a modification of the invention shown in Figures 1 and 2, Figure 8 is a still further modification of a welded connection made according to my invention, Figure 9 shows a lateral connection made according to my invention, Figures 10 and 11 show details of construction of a connection made according to any invention and utilized for high pressure work, Figure 12 shows a still further modification of my invention intended for high pressure work and Figure 13 is a longitudinal section taken along the line 13—13 of Figure 12.

Referring to Figures 1 and 2 of the drawing, the header pipe 20 which could also be a pressure vessel is provided with an aperture 21 into which is fitted a coupling member 22 made according to my invention and provided with the positioning stakes or stubs 24, the coupling member receiving the connecting or distributing pipe 23. As shown in assembled form in Figure 2, the coupling member 22 is provided with a bore having flared portions 25 and 26 to provide an inwardly directed flare, the diameter of the small portion 26 being coincident with the diameter of the connecting pipe 23. The coupling is counterbored to provide a shoulder 27, the connecting pipe 23 being received within the counterbore to rest on the internal shoulder 27.

In order to insure inside welding or fusing of the coupling member 22, header 20 and coupling pipe 23, I spray a silver alloy at the portions 28 and 29 of the coupling member, the diameter of the coupling member 28 being slightly smaller than bore 28 in the header pipe and the counterbore providing shoulder 27 being slightly larger in diameter than pipe 23 to be received therein. It will be noted that the lower end of the coupling member 22 has a transverse contour coinciding with the internal surface of the header 20. This may be formed by using a milling machine of the proper diameter so that the inner surface of the header 20 and the lower end of the coupling member 22 register with each other when the two are placed in proper relationship with each other for welding.

It is only necessary to drill a bore or aperture 21 of the proper diameter to receive the coupling member 22 thereby eliminating the usual procedure required in boring, filing, etc. in order to provide the desired opening, since the drilling produces a finished wall surface.

With the parts in position as shown in Figure 2, a weld is made at 30 and 31, the heat from the weld causing the silver alloy or any other suitable alloying material to flow and securely fuse or weld the internal contacting surfaces of the header member 20, coupling member 22 and the pipe 23.

Instead of utilizing inserted pins, such as 24, in the coupling member, stakes or studs 24' integral with the coupling may be utilized as shown in Figures 5 and 6 at 24'. These positioning stakes may be made by a slide machine having the forming members 24" for forming the stake or stud in the surface of the coupling device 22'. This avoids the necessity for drilling apertures and inserting pins 24 as is the case in Figures 3 and 4. These pins or staked tips solve a troublesome problem of properly seating the couplings, which problem has been of long standing.

In Figure 7 is shown a coupling member providing a side outlet and positioned off center with respect to the header. The header 35 has an aperture into which the coupling member 36 is inserted. As shown one side is extended to fit the curvature of the header 35. This coupling member 36 is provided with the integral stakes 40 and 41 of which there may be four positioned at 90° intervals with respect to each other around the periphery of the coupling member. The flared bore comprising the cone-shaped sections 37 and 38 smoothly merge into the walls of the pipe 42, the coupling member 36 being counterbored to provide the shoulder 39 against which the end of the member 42 abuts. Welds 41 and 43 are provided, contacting walls being welded together by silver alloy at 28' and 29' as in Figure 2. The inner end of the coupling member is again preformed to register with the inner surface of the header 35.

In Figure 8 is shown another form of my invention utilizing lug-like positioning elements and a saddle member utilized for high pressure work.

The coupling member 46 is provided with lugs 47, preferably positioned at 90° intervals around the coupling member. These lugs position the coupling member in header 45, which is provided with an aperture for receiving the inner end of the coupling member. A weld is then made at 49. After the weld 49 is made the saddle 51 is positioned in place and welded at 52 and 53 to the header and to the coupling member. The connecting pipe 48 may then be positioned within the coupling member and welded at 50.

In Figure 9 is shown a 45° lateral and the coupling device made according to my invention for connecting the pipe to the header.

The header 55 is again provided with a bored aperture for receiving coupling member 56, the inner end of which is provided with a flared bore comprising portions 57 and 58, the walls of which register with the inner wall of the pipe 59 positioned within the counterbore having shoulder 60. Stakes such as 61 on the coupling member position the coupling member with respect to the header and welds are made at 62 and 63 as shown. The silver alloy surfaces at 64 and 65 provide the internal welds between the coupling member, the header and the pipe.

In Figure 10 is shown the type of coupling member used for high pressure devices. Coupling member 71 is provided with an enlarged portion 72 so as to provide a shoulder 72' between the inner end of the coupling member and the header 70. The member 71 may again be provided with the usual positioning lugs or pins 73 and the weld made as at 74, the pipe 76 being received within the coupling member 72 to which it is welded as at 75, the shoulder, not shown, being in butting relationship with the received end of pipe 76.

In Figure 11 is shown a modification of the welded connection shown in Figure 10. This particular arrangement is again intended for high pressure work but the coupling member 71 having the enlarged portion 72" is provided with a saddle-like shoulder 72₁. Otherwise the arrangements shown in Figures 10 and 11 are the same.

In Figure 12 I show still another form of welded connection made according to my invention and intended for high pressure work. Here the coupling member 81 is again received within an aperture in a header 80. The bore 82 has somewhat the same shape as the bores in the other forms and receives within it pipe 83. Positioning lugs such as 84 and 85 in the form of fins or vanes are spaced around the periphery of the coupling member and may be made integral therewith during manufacturing so that the coupling may be handled as a complete unit when the connection is made, the apertures 84' and 85' being provided to permit the flow of welding material entirely around the coupling member. The weld is preferably continued along the lug between the header 80 and the coupling member 81. The bottom of the lugs are shaped to conform to the outer surface of the header.

It is obvious that the welding ribs or fins 85 could be used in the high pressure form of the device shown in Figures 10 and 11. They can also be used successfully with all size pipes and couplings.

Thus I have provided a welded connection useful for both high and low pressure usage, and which is of novel design, which is immune to shock and vibration and incident relative motion. I have provided a coupling which is easy and quickly positioned in registering relationship with a header and with which the time for making the welded connections is reduced to a matter of minutes and in which outside and inside welds are simultaneously produced, the coupling being properly and accurately seated as soon as inserted into the aperture in the header. The coupling is designed to insure a free flow of fluid or liquid.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A metallic coupling member for use under pressure and providing a fused welded coupling between a hollow member having an aperture for receiving one end of said coupling member and for engaging a metallic tubular member at its other end, said coupling member having a bore extending therethrough, the end of said coupling member to be received within said aperture being formed to register with the internal surface of said hollow member, and a plurality of normally directed positioning elements on the exterior of said coupling member adjacent said one end, said positioning elements being oppositely disposed and lying along a transverse axis of said coupling member to engage the outer surface of said hollow member and position said one end of said coupling member within said aperture in registering relationship with the inner surface of said hollow member during welding operations, said positioning means comprising integral up-set lugs formed by upsetting material from the surface of said coupling member.

2. A coupling member for providing a coupling between a first tubular member having an aperture for receiving one end of said coupling member and for engaging a second tubular member at its other end, said coupling member having a bore extending therethrough, the end of said coupling member to be received within said aperture being formed to register with the internal surface of said first tubular member, and a plurality of pairs of normally directed positioning elements on the exterior of said coupling member adjacent said one end, each pair of said positioning elements being oppositely disposed and lying along a transverse axis of said coupling member to engage the outer surface of said first tubular member and position the coupling member with its inner end within said aperture in registering relationship with the inner surface of said first tubular member, said positioning means comprising integral up-set lugs formed by upsetting material from the surface of said coupling member.

3. A coupling member for providing a coupling between a hollow member having an aperture for receiving one end of said coupling member and for engaging a tubular member at its other end, said coupling member having a bore extending therethrough, the end of said coupling member to be received within said aperture being formed to register with the internal surface of said hollow member, and a plurality of normally directed positioning elements on the exterior of said coupling member adjacent said one end, said positioning elements being oppositely disposed and lying along a transverse axis of said coupling member to engage the outer surface of said hollow member and position the coupling member with said one end in registering relationship with the inner surface of said hollow member, said positioning elements comprising two pairs of integral up-set lugs formed by upsetting material from the surface of said coupling member, each pair of lugs lying along a transverse axis, the axis of one pair of lugs being disposed 90° with respect to the axis of the other pair of lugs, said lugs being tangent to a line defined by the intersecting outside surfaces of said coupling member and said hollow member when said coupling member and said hollow member are in engaging relationship.

WILLIAM W. VANDER CLUTE.

REFERENCES CITED

The following references are of record in the file of this patent:

UNITED STATES PATENTS

| Number | Name | Date |
| --- | --- | --- |
| 1,883,439 | Adams | Oct. 18, 1932 |
| 2,015,246 | Taylor | Sept. 24, 1935 |